United States Patent
Woods et al.

(10) Patent No.: US 10,989,168 B2
(45) Date of Patent: Apr. 27, 2021

(54) WIND TURBINE YAW BRAKE WITH ANTI-ROTATION BUSHING

(71) Applicant: S.B. Patent Holding ApS, Vejstrup (DK)

(72) Inventors: James A. W. Woods, Vejstrup (DK); Esben Rasmussen, Svendborg (DK); Stefan Hareskov Rasmussen, Svendborg (DK)

(73) Assignee: S.B. Patent Holding ApS, Vejstrup (DK)

( * ) Notice: Subject to any disclaimer, the term of this patent is extended or adjusted under 35 U.S.C. 154(b) by 0 days.

(21) Appl. No.: 17/010,159

(22) Filed: Sep. 2, 2020

(65) Prior Publication Data

US 2021/0079887 A1 Mar. 18, 2021

Related U.S. Application Data

(60) Provisional application No. 62/901,833, filed on Sep. 18, 2019.

(51) Int. Cl.
*F16D 65/18* (2006.01)
*F03D 7/02* (2006.01)
(Continued)

(52) U.S. Cl.
CPC ........... *F03D 7/0244* (2013.01); *F03D 80/70* (2016.05); *F16D 55/225* (2013.01); *F03D 80/50* (2016.05);
(Continued)

(58) Field of Classification Search
CPC . F16D 55/40; F16D 55/224–226; F16D 65/18
(Continued)

(56) References Cited

U.S. PATENT DOCUMENTS 4,386,682 A * 6/1983 Woo ............... F16D 55/224
188/196 P
5,249,649 A * 10/1993 Emmons ............ F16D 55/226
188/370
(Continued)

FOREIGN PATENT DOCUMENTS

CN 202851758 U 4/2013
CN 208935226 U 6/2019

OTHER PUBLICATIONS

International Search Report issued in corresponding International (PCT) Patent Application No. PCT/US2020/049006 (dated Dec. 17, 2020)

(Continued)

*Primary Examiner* — Christopher P Schwartz
(74) *Attorney, Agent, or Firm* — Reising Ethington P.C.

(57) ABSTRACT

A yaw brake for a wind turbine includes a brake housing disposed on one or both sides of a brake surface disposed about a yaw axis. The housing defines a bore and a piston is disposed within the bore. The piston is configured for movement within the bore along an axis between first and second positions in which the piston applies different braking forces to the brake surface. At least one portion of the piston and at least one portion of the bore of the brake housing have complementary non-circular shapes. The at least one portion of the piston is configured to be positioned within and least one portion of the bore when the piston is in the first and second positions. A bushing is disposed radially between the at least one portion of the piston and the at least one portion of the bore of the brake housing.

18 Claims, 3 Drawing Sheets

(51) Int. Cl.
*F03D 80/70* (2016.01)
*F16D 55/225* (2006.01)
*F03D 80/50* (2016.01)
*F16D 125/06* (2012.01)

(52) U.S. Cl.
CPC ........ *F05B 2260/902* (2013.01); *F16D 65/18* (2013.01); *F16D 2125/06* (2013.01)

(58) Field of Classification Search
USPC ................................................ 188/72.1–72.4
See application file for complete search history.

(56) References Cited

U.S. PATENT DOCUMENTS

| | | | | |
|---|---|---|---|---|
| D341,145 S | * | 11/1993 | Esworthy | ..................... D15/143 |
| 5,322,146 A | * | 6/1994 | Holl | ........................ B60T 1/065 |
| | | | | 188/138 |
| 7,779,971 B2 | * | 8/2010 | Adachi | ................... F16D 65/18 |
| | | | | 188/72.1 |
| 8,317,462 B2 | * | 11/2012 | Daniels | ................. F16D 66/025 |
| | | | | 415/123 |
| 9,874,257 B2 | * | 1/2018 | Son | ......................... F16D 65/18 |
| 2010/0181151 A1 | * | 7/2010 | Bingham, Jr. | .......... F16D 55/40 |
| | | | | 188/72.4 |
| 2016/0146345 A1 | * | 5/2016 | Koshikawa | ........... F16D 55/225 |
| | | | | 188/72.4 |
| 2019/0063519 A1 | | 2/2019 | Al-Mahshi | |
| 2020/0182320 A1 | * | 6/2020 | Barbosa | ..................... F16J 1/00 |

OTHER PUBLICATIONS

Written Opinion issued in corresponding International (PCT) Patent Application No. PCT/US2020/049006 (dated Dec. 17, 2020).

* cited by examiner

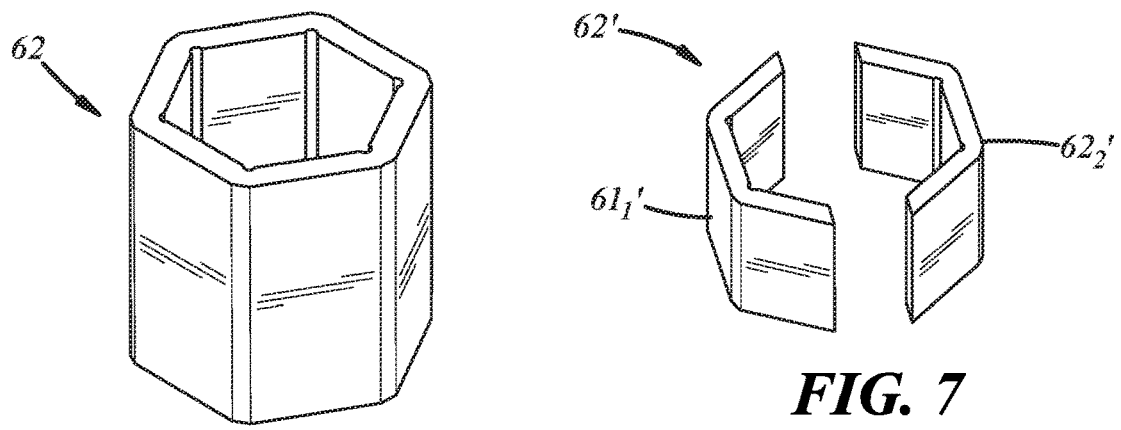
FIG. 6
FIG. 7
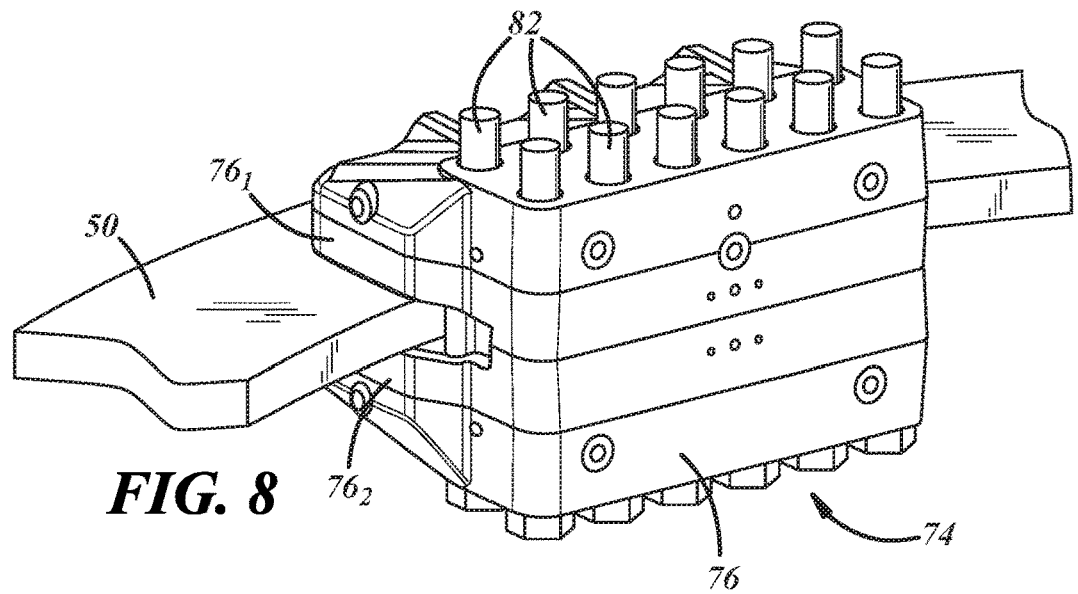
FIG. 8
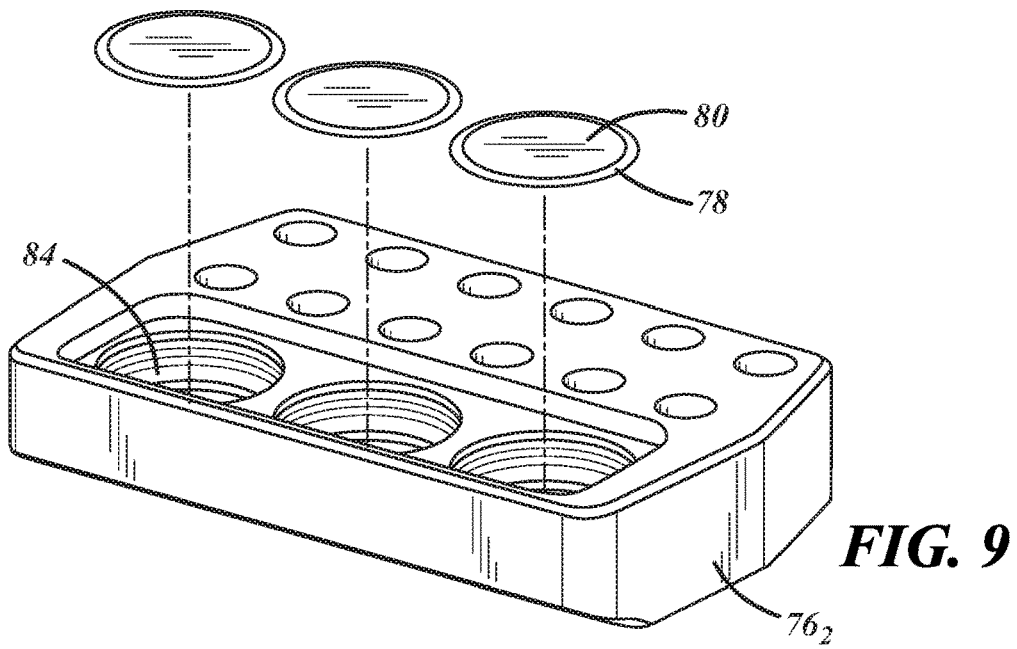
FIG. 9

WIND TURBINE YAW BRAKE WITH ANTI-ROTATION BUSHING

BACKGROUND OF THE INVENTION a. Field of the Invention

This invention relates to yaw brakes used in wind turbines. In particular, the invention relates to a yaw brake that includes a bushing between corresponding anti-rotation features in a housing and piston of the brake to reduce wear on the anti-rotation features and facilitate servicing of the brake.

b. Background Art

In a conventional horizontal axis wind turbine, a tower extends vertically from the ground and a nacelle is disposed on top of the tower. The nacelle houses and supports the electricity generating components of the wind turbine including a rotor having a hub supported on a shaft that rotates about a substantially horizontal axis, one or more blades extending radially from the hub and a generator that generates electricity responsive to rotation of the shaft.

The nacelle is configured to rotate relative to the tower about a substantially vertical or yaw axis in order to orient the blades in the direction of the prevailing wind. Proper orientation of the nacelle is important to prevent uneven loads on the rotor and to maximize the efficiency of the wind turbine. Rotation of the nacelle relative to the tower is controlled by a yaw system. The yaw system may, for example, include a toothed ring that is fixed to the tower and a motor activated gear fixed to the nacelle and in mesh with the toothed ring such that activation of the motor results in rotation of the nacelle relative to the tower. Bearings may be interposed between the tower and nacelle to facilitate rotation of the nacelle relative to the tower. The yaw system further includes a braking surface such as a brake disc or the top of the bearing ring that is fixed to the tower (e.g., as a part of the toothed ring) or nacelle and a plurality of yaw brakes that can engage the braking surface when partially applied to control and dampen movement of the nacelle about the yaw axis and when fully applied to fix the rotational position of the nacelle relative to the tower.

The yaw brakes in a conventional yaw system experience significant loads both when partially applied and fully applied. The relative rotational movement between the yaw brakes and the braking surface during movement of the nacelle about the yaw axis relative to the tower imparts rotational forces to components of the brakes through the friction interface between the brakes and braking surface. These forces can cause rotation of traditionally round brake pistons and resulting damage to fluid seals within the brake. To address these issues, yaw brakes have been developed with brake housings and pistons or piston extensions having non-circular geometries to prevent rotation of the brake piston within the brake housing. The surfaces of the brake housing and piston, however, suffer significant wear due to loads imparted by the yawing motion and the axial movement of the piston during application of the brake leading to frequent, and costly, repairs as well as downtime for the wind turbine.

The inventors herein have recognized a need for a yaw brake for a wind turbine that will reduce one or more of the above-identified deficiencies and/or provide improved performance.

BRIEF SUMMARY OF THE INVENTION

This invention relates to yaw brakes used in wind turbines. In particular, the invention relates to a yaw brake that includes a bushing between corresponding anti-rotation features in a housing and piston of the brake to reduce wear on the anti-rotation features and facilitate servicing of the brake.

A yaw brake for a wind turbine in accordance with one embodiment includes a brake housing disposed on one side of a brake surface disposed about a yaw axis. The brake housing defines a bore. The brake further includes a piston disposed within the bore of the brake housing and configured for movement within the bore along a first axis between a first position in which the piston applies a first braking force to the brake surface and a second position in which the piston applies a second braking force to the brake surface, the second braking force greater than the first braking force. At least one portion of the piston and at least one portion of the bore of the brake housing have complementary non-circular shapes. The at least one portion of the piston is configured to be positioned within the at least one portion of the bore of the brake housing when the piston is in the first position and the second position. The brake further includes a bushing disposed radially between the at least one portion of the piston and the at least one portion of the bore of the brake housing having the complementary non-circular shapes.

A yaw brake for a wind turbine in accordance with another embodiment includes a brake housing defining first and second jaws configured to be disposed on opposite sides of a brake surface disposed about a yaw axis. The brake housing defines a bore in one of the first and second jaws. The brake further includes a piston disposed within the bore of the brake housing and configured for movement within the bore along a first axis between a first position in which the piston applies a first braking force to the brake surface and a second position in which the piston applies a second braking force to the brake surface, the second braking force greater than the first braking force. At least one portion of the piston and at least one portion of the bore of the brake housing have complementary non-circular shapes. The at least one portion of the piston is configured to be positioned within the at least one portion of the bore of the brake housing when the piston is in the first position and the second position. The brake further includes a bushing disposed radially between the at least one portion of the piston and the at least one portion of the bore of the brake housing having complementary non-circular shapes.

A yaw brake for a wind turbine in accordance with the present teachings represents an improvement as compared to conventional yaw brakes for wind turbines. The use of a bushing between the piston and brake housing reduces wear on the surfaces of the piston and brake housing thereby reducing costly repairs and downtime for the wind turbine. The bushing can also be more easily replaced than other components of the brake thereby improving the serviceability of the brake. Because the bushing is replaceable, the bushing can be made from materials that are relatively low in cost and have other beneficial properties. Finally, in the event of a failure in the bushing, the shape of the piston and brake housing ensures that the application axial brake force is not impeded.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 6 is a perspective view of one embodiment of an anti-rotation bushing of the brake of FIGS. 4-5.

FIG. 7 is a perspective view of another embodiment of an anti-rotation bushing of the brake of FIGS. 4-5.

FIG. 8 is a perspective view of a yaw brake for a wind turbine in accordance with another embodiment of the present teachings.

FIG. 9 is an exploded perspective view of a portion of the yaw brake of FIG. 8.

DETAILED DESCRIPTION OF THE INVENTION

Figure 1:
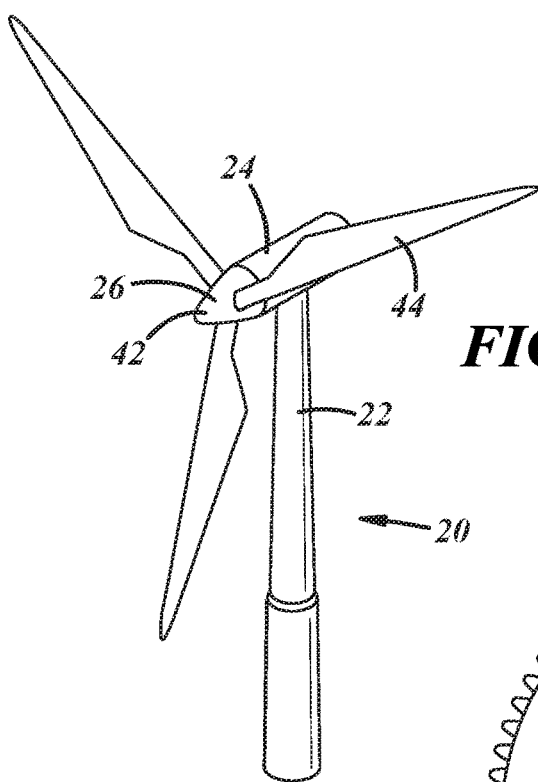
FIG. 1 is a perspective view of a wind turbine.
Figure 2:
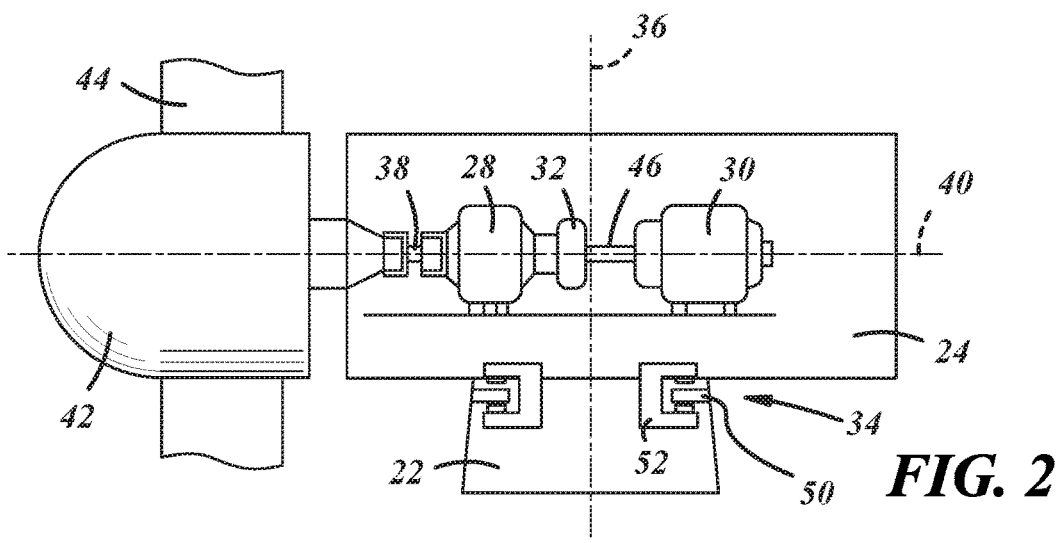
FIG. 2 is a schematic view of a portion of the wind turbine of FIG. 1.

Referring now to the drawings wherein like reference numerals are used to identify identical components in the various views, FIGS. 1-2 illustrate a wind turbine 20 in accordance with one embodiment of the present invention. Turbine 20 is provided to convert wind energy to electrical energy. Turbine 20 comprises a horizontal axis wind turbine (HAWT). Turbine 20 may include a tower 22, a nacelle 24, a rotor 26, a gearbox 28, a generator 30, a brake 32 and a yaw system 34.

Tower 22 provides structural support for turbine 20 and is provided to locate rotor 26 in higher velocity winds further from the ground. In the illustrated embodiment, tower 22 comprises a freestanding tower that is supported by a foundation (not shown) and, in particular, a cylindrical monopole tower. It should be understood, however, that tower 22 may comprise other forms of freestanding towers such as a self-supporting lattice tower or towers that have support elements such as guy wires or buttresses including guyed lattice towers or tilt-up towers. Tower 22 may be made from rolled steel plates that are fastened together by welds or other fasteners. Tower 22 may include internal and external ladders and doors to allow access to components of turbine 20 on top of tower 22 including in nacelle 24.

Nacelle 24 houses and supports the electricity generating components of turbine 20 and provides a means for orienting rotor 26 relative to prevailing winds. Referring to FIG. 2, nacelle 24 is supported on tower 22 and is configured to rotate relative to tower 22 about a vertical or yaw axis 36 extending longitudinally through tower 22.

Rotor 26 converts straight-line wind forces into torque used to rotate a shaft 38 about a substantially horizontal axis 40 (relative to earth ground). Rotor 26 includes a hub 42 coupled to the shaft 38 and one or more blades 44 extending radially outward from the hub 42. Straight-line winds cause blades 44—and therefore hub 42 and shaft 38—to rotate about axis 40.

Gearbox 28 is provided to translate the low speed, high torque rotation of shaft 38 into a high speed, low torque rotation of a shaft 46 extending into generator 30. Gearbox 28 may comprise, for example, a planetary gearbox, helical gearbox or worm gearbox. It should be understood that gearbox 28 may be eliminated and generator 30 may be driven directly by rotor 26 depending on the design of generator 30.

Generator 30 is provided to convert mechanical energy from the rotation of shaft 46 into electrical energy. Generator 30 may comprise an asynchronous machine and may be coupled to an electricity grid through conventional conductors.

Brake 32 is provided to reduce or halt rotation of shaft 46 during, for example, maintenance of turbine 20 or during periods with extremely strong winds to prevent damage to generator 30. Brake 32 may comprise a drum brake or a disc brake.

Figure 3:
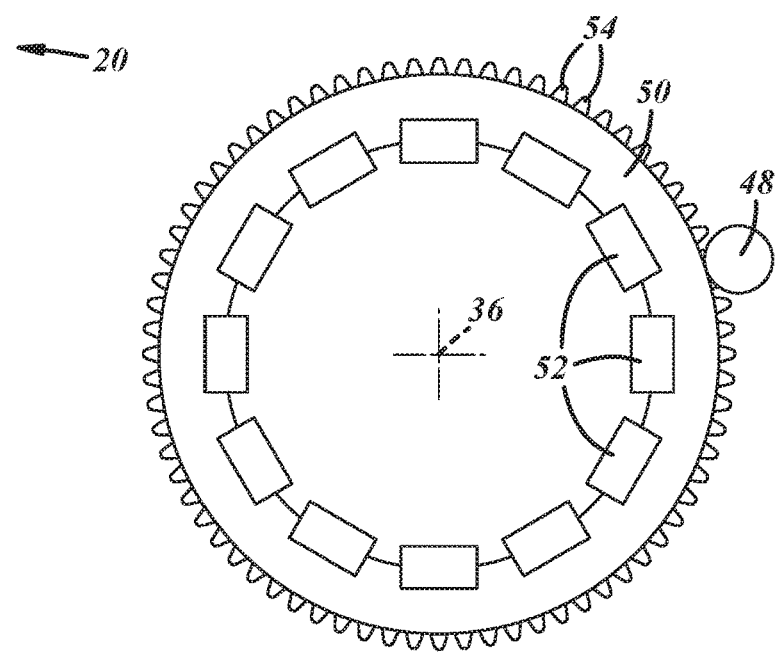
FIG. 3 is a cross-sectional view of the wind turbine of FIGS. 1-2.

Yaw system 34 controls the rotational position of nacelle 24 relative to tower 22 in order to locate rotor 26 relative to prevailing winds. Referring to FIGS. 2-3, yaw system 34 may include a yaw drive 48, a brake disc 50, and a plurality of yaw brakes 52 in accordance with the present teachings. Yaw system 34 may also include a yaw bearing (not shown) such as a roller bearing or gliding bearing disposed between the tower 22 and nacelle 24.

Referring to FIG. 3, yaw drive 48 is provided to cause rotation of nacelle 24 relative to tower 22 about yaw axis 36. Drive 48 may be mounted on nacelle 24 and may include a motor, such as an alternating current motor, a gearbox configured to increase the output torque of the motor, and a gear that is driven by the motor and that has gear teeth configured to mesh with teeth 54 on a toothed ring affixed to tower 22. In the illustrated embodiment, the teeth 54 are formed on an outer periphery of brake disc 50. It should be understood, however, that the teeth 54 could be formed on a radially inner perimeter of brake disc 50 or that the toothed ring could be formed as an entirely separate structure from brake disc 50. Further, it should be understood that the relative positions of yaw drive 48 and the toothed ring could be reversed such that the toothed ring is mounted on nacelle 24 while the yaw drive is mounted on tower 22.

Brake disc 50 provides a braking surface that may be engaged by yaw brakes 52. In the illustrated embodiment, disc 50 also forms a toothed ring that may be engaged by yaw drive 48 to cause rotation of nacelle 24 relative to tower 22. Disc 50 is annular in shape and is mounted on tower 22 in the illustrated embodiment. Disc 50 is disposed about, and may be centered about, yaw axis 36.

Yaw brakes 52 are provided to control and dampen rotational movement of nacelle 24 relative to tower 22 during rotation of nacelle 24. Yaw brakes 52 are also provided to maintain nacelle 24 in a fixed rotational position relative to tower 22 once nacelle 24 has reached a desired position. Brakes 52 may be mounted on nacelle 24. It should be understood, however, that the relative positions of brake disc 50 and brakes 52 could be reversed such that the brake disc 50 is mounted on nacelle 24 while brakes 52 are mounted on tower 22. Brakes 52 may be disposed about the radially inner perimeter of disc 50 and circumferentially spaced from one another as shown in FIG. 3. It should be understood, however, that brakes 52 may alternatively be disposed about the radially outer perimeter of disc 50 depending on the design of turbine 20. Brakes 52 may be arranged to act on one or both sides of disc 50 or another braking surface.

Figure 4:
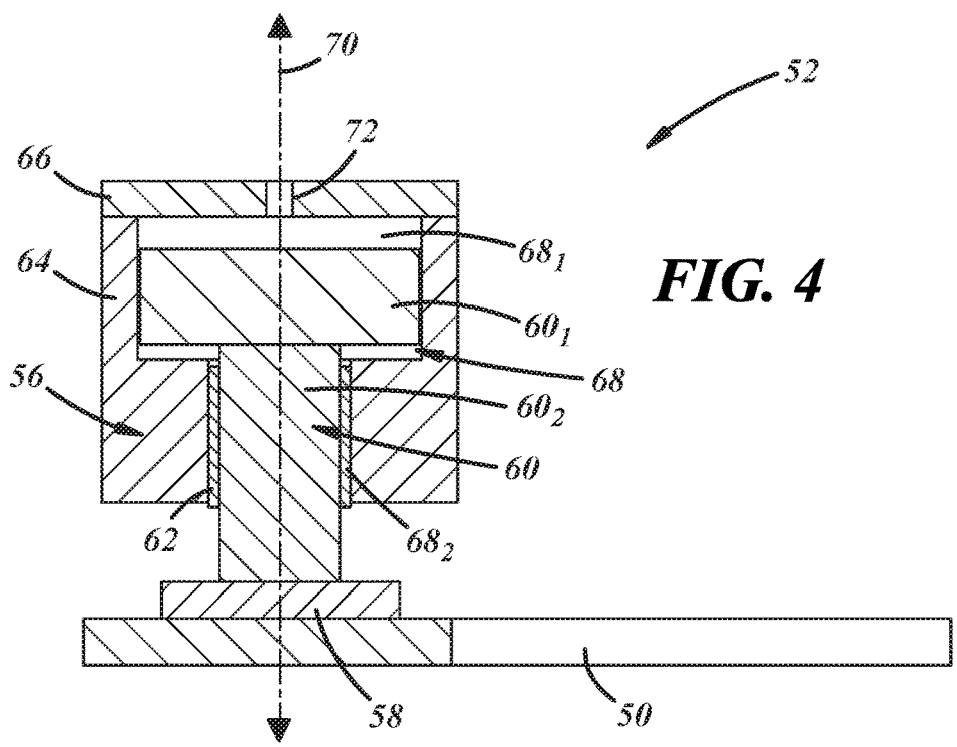
FIG. 4 is a cross-sectional view of a yaw brake for a wind turbine in accordance with one embodiment of the present teachings.
Figure 5:
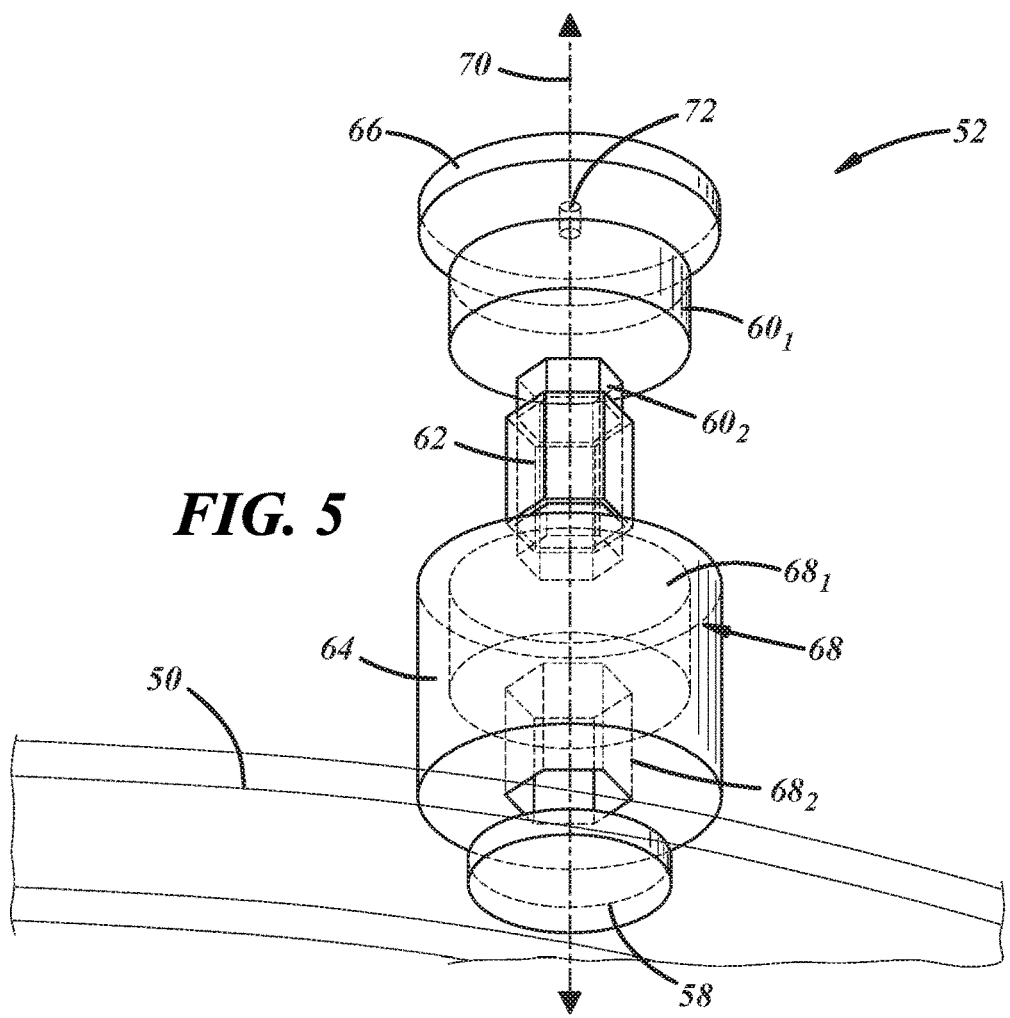
FIG. 5 is an exploded perspective view of the yaw brake of FIG. 4.

Referring now to FIGS. 4-5, one embodiment of a yaw brake 52 in accordance with the present teachings will be described. Brake 52 may include a brake housing 56, a brake pad 58 and a piston 60. In accordance with the present teachings, brake 52 may further include an anti-rotation bushing 62.

Housing 56 provides structural support for and orients the other components of brake 52. Housing 56 may be made from conventional metals or plastics. In the illustrated embodiment, housing 56 includes multiple members 64, 66. Members 64, 66 are generally circular in the illustrated embodiment, but it should be understood that the shape of members 64, 66 may vary. Member 64 defines a bore 68 disposed about a central axis 70 and extending through member 64. Bore 68 may have a varying diameter and shape along its axial extent. A first portion $68_1$ of the bore 68 is configured to receive a portion of piston 60 and defines a fluid chamber on a first side of piston 60. Portion $68_1$ of bore 68 may be circular in shape. One or both of portion $68_1$ of bore 68 and the portion of piston 60 disposed within portion $68_1$ of bore 68 may define grooves configured to receive fluid seals (not shown). During braking, rotational forces from the braking interface between a braking surface such as brake disc 50 and brake pad 58 are transmitted to piston 60. In many conventional brakes in which piston 60 and bore 68 are circular throughout their axial extent, these forces may result in rotation of piston 60 and damage to the fluid seals resulting in costly maintenance and downtime for brake 52. In the illustrated embodiment, however, a second portion 682 of bore 68 is provided with a non-circular shape configured to receive a non-circular portion of piston 60 and bushing 62 and thereby prevent rotation of piston 60. Portion 682 of bore 68 may define a variety of non-circular shapes intended to inhibit rotation of piston 60. In some embodiments, portion 682 of bore 68 may include one or more flats. In the illustrated embodiment, portion $68_2$ of bore 68 has a hexagonal shape, but it should be understood that the number of flats in portion $68_2$ of bore 68 may vary from one (e.g., a D shape) to a potentially infinite number of flats. Further, it should be understood that portion $68_2$ of bore 68 and the portion of piston 60 disposed within portion $68_2$ of bore 68 may have other complementary, non-circular shapes to prevent rotation including mating splines, a key and keyway or lugs and notches of various shapes. Member 66 of housing 56 encloses the fluid chamber defined by member 64 and defines one or more fluid channels 72 through which fluid may be provided to, and removed from, the fluid chamber. In the illustrated embodiment, fluid channel 72 is centered about axis 70, but the number and location of the fluid channels 72 may vary.

Brake pad 58 is provided for frictional engagement with a braking surface such as brake disc 50 or a surface of a yaw bearing race in order to control and dampen rotational movement of nacelle 24 relative to tower 22 when brake 52 is partially applied and in order to maintain nacelle 24 in a fixed position relative to tower 22 when brake 52 is fully applied. Brake pad 58 may be made from conventional friction materials. In the illustrated embodiment, brake pad 58 has a substantially circular shape. It should be understood, however, that the shape of pad 58 may vary.

Piston 60 is provided to transfer fluid pressure to brake pad 58 to urge brake pad 58 into frictional engagement with a braking surface such as brake disc 50 or a surface of a yaw bearing race to partially and fully apply brake 52. Piston 60 is disposed within bore 68 of member 64 of housing 56 and is configured for movement within the bore 68 along axis 70 between one position in which piston 60 applies a first braking force to the braking surface through brake pad 58 to partially apply brake 52 and another position in which piston 60 applies a second braking force, greater than the first brake force, to the braking surface through brake pad 58 to fully apply brake 52. Movement of piston 60 within bore 68 may be controlled by changes in fluid pressure in bore 68 caused by delivery and removal of fluid from bore 68 on a side of piston 60 opposite the side that engages brake pad 58. Alternatively, piston 60 may be moved within bore 68 using electromagnetic force. In the illustrated embodiment piston 60 includes multiple members $60_1$, $60_2$. It should be understood, however, that members $60_1$, $60_2$ may alternatively form a unitary (one-piece) body. Member $60_1$ is configured to be received with portion $68_1$ of bore 68 of member 64 of housing 56 and may be circular in shape. Member $60_2$ is configured to be received within portion $68_2$ of bore 68 and is disposed within portion $68_2$ of bore 68 when brake 52 is partially and fully applied. At least a portion of member $60_2$ has a non-circular shape. The shape of the portion of member $60_2$ is complementary to the shape of portion $68_2$ of bore 68. The complementary non-circular shapes of member $60_2$ of piston 60 and portion $68_2$ of bore 68 prevent rotation of piston 60 within brake housing 56 and resulting damage to fluid seals. Member $60_2$ may be coupled to member $60_1$ in a variety of ways including mating screw threads or by using conventional fasteners such as screws, pins, adhesives or welds.

Anti-rotation bushing 62 is provided to absorb loads at the load-bearing interface between member $60_2$ of piston 60 and portion $68_2$ of bore 68 in brake housing 56. Because of the significant rotational forces imparted to piston 60 through the interface between the braking surface and brake pad 58 (as well as the axial movement of piston 60 within bore 68 during application and release of brake 52), anti-rotation geometries such as those in member $60_2$ of piston 60 and portion 682 of bore 68 have been found to exhibit significant wear leading to a reduction in the useful life of brake 52 and significant maintenance requirements and downtime for turbine 20. Bushing 62 is provided to address this problem by providing a relatively low cost member that is capable of absorbing the loads at the interface between piston 60 and bore 68 to prevent damage to piston 60 and bore 68, yet may be relatively easily replaced on a predetermined maintenance schedule. In some embodiments, bushing 62 may be made be made from materials that are softer than member $60_2$ of piston 60 and member 64 of housing 56 and may be made from a polymer material in some embodiments such as polyethylene terephthalate. In other embodiments, bushing 62 may be made from materials that are harder than member $60_2$ of piston 60 and member 64 of housing 56 such as a hardened metal to reduce galling. Bushing 62 is disposed radially between member $60_2$ of piston 60 and portion $68_2$ of bore 68. Bushing 62 has a shape that is complementary to the shape of member $60_2$ of piston 60 and portion $68_2$ of bore 68 and is therefore hexagonal in the illustrate embodiment. Referring to FIG. 6, bushing 62 may be formed as unitary or one-piece part that slides over member $60_2$ of piston 60 during assembly of brake 52. Referring to FIG. 7, in an alternate embodiment, a bushing 62' may be formed from multiple members. In the illustrated embodiment, bushing 62' is formed from multiple members $62_1$' and $62_2$'. Each of members $62_1$' and $62_2$' is configured to be located between one circumferential portion of member $60_2$ of piston 60 and one circumferential portion of portion $68_2$ of bore 68. In the illustrated embodiment, each of members $62_1$' and $62_2$' span one half of the circumference of member $60_2$ of piston 60. Bushing 62' may be assembled onto piston 60 by sliding members $62_1$' and $62_2$' axially along piston 60 or by moving members $62_1$' and $62_2$' radially inward relative to piston 60. Bushing 62 or 62' may be configured to move with piston 60 relative to the surfaces of bore 68 or may be configured to remain in place within bore 68 such that piston 60 moves relative to bushing 62 or 62'. In this regard, bushing 62 or 62' and piston 60 or the surfaces of bore 68 may be shaped in a complementary manner to prevent relative movement along axis 70 or bushing 62 or 62' and/or piston 60 or brake housing 56 may be sized to create an interference fit between bushing 62 or 62' and one of piston 60 and brake housing 56. In alternative embodiments, bushing 62 or 62' may be configured to float freely between the surfaces of bore 68 and piston 60 with the result that bushing 62 or 62' 62' will tend to move relative to the surfaces of one of bore 68 or piston 60 depending on which, if any, has a smoother surface (e.g., bushing 62 or 62' may find application in facilitating re-use of a brake housing 56 in which the surfaces of bore 68 have become damaged).

Referring now to FIGS. 8-9, another embodiment of a yaw brake 74 in accordance with the present teachings will be described. Brake 74 may include a brake housing 76, brake pad backing plates 78, and brake pads 80. Brake 74 further includes a plurality of pistons and anti-rotation bushings similar to pistons 60 and bushings 62 or 62' described above.

Brake housing 76 again provides structural support for and orients the other components of brake 76. Housing 76 may again be made from conventional metals or plastics. Brake housing 76 differs from brake housing 56 of brake 52 in that brake housing 76 is in the form of a caliper defining jaws 76₁, 76₂ or yokes that are configured to be disposed on opposite sides of a braking surface such as brake disc 50 or a surface of yaw bearing race. Jaws 76₁, 76₂ may comprise separate structures that are coupled together using bolts 82 or other conventional fasteners and may be fixed nacelle 24 (or, alternatively, to tower 22 when brake disc 50 is fixed to nacelle 24). Referring to FIG. 9, each jaw 76₁, 76₂ may define a plurality of bores 84 configured to receive corresponding plates 78 and brake pads 80 along with pistons and bushings similar to pistons 60 and bushings 62 or 62' described hereinabove. A portion of each bore 84 may define a non-circular surface as described hereinabove and configured to receive a non-circular portion of piston 60 and bushing 62 or 62'. In the illustrated embodiment, each jaw 76₁, 76₂ includes three bores 84 configured to house three corresponding pistons 60 and bushings 62 or 62'. It should be understood, however, that the number of bores 84 in each jaw 76₁, 76₂ may vary. Further, although jaws 76₁, 76₂ may have substantially the same shape and construction and may be mirror images of one another, jaws 76₁, 76₂ may alternatively have a different shape and construction. For example, in certain embodiments only one of jaws 76₁, 76₂ defines bores 84 for pistons 60 and bushings 62 or 62' while the other jaw 76₁, 76₂ is configured to support a sliding brake pad. Housing 76 may further defines one or more fluid passageways (not shown) for delivery of fluid to, and removal of fluid from, bores 84 and may define a fluid connection to a source of fluid. The fluid may be hydraulic or pneumatic.

Brake pad backing plates 78 are provided to support and orient brake pads 80 and provides a rigid surface against which pistons 60 may apply a force to cause movement of brake pads 80 into and out of engagement with a braking surface such as brake disc 50. Backing plates 78 may be made from conventional metals and metal alloys or composite materials. In the illustrated embodiment backing plates 78 have a substantially circular shape. It should be understood, however, that the shape of plates 78 may vary.

Brake pads 80 are provided for frictional engagement with a braking surface such as brake disc 50 in order to control and dampen rotational movement of nacelle 24 relative to tower 22 when brakes 74 are partially applied and in order to maintain nacelle 24 in a fixed position relative to tower 22 when brakes 74 are fully applied. Brake pads 80 may be made from conventional friction materials. In the illustrated embodiment, brake pads 80 have a substantially circular shape. It should be understood, however, that the shape of pads 80 may vary.

A yaw brake 52 or 74 for a wind turbine 20 in accordance with the present teachings represents an improvement as compared to conventional yaw brakes for wind turbines. The use of a bushing 62 or 62' between the piston 60 and brake housing 56 or 76 reduces wear on the surfaces of the piston 60 and brake housing 56 or 76 thereby reducing costly repairs and downtime for the wind turbine 20. The bushing 62 or 62' can also be more easily replaced than other components of the brake 52 or 74 thereby improving the serviceability of the brake 52 or 74. Because the bushing 62 or 62' is replaceable, the bushing 62 or 62' can be made from materials that are relatively low in cost and have other beneficial properties. Finally, in the event of a failure in the bushing 62 or 62', the shape of the piston 60 and brake housing 56 or 76 ensures that the application axial brake force is not impeded.

While the invention has been shown and described with reference to one or more particular embodiments thereof, it will be understood by those of skill in the art that various changes and modifications can be made without departing from the spirit and scope of the invention.

What is claimed is:

1. A yaw brake for a wind turbine, comprising:
   a brake housing disposed on one side of a brake surface disposed about a yaw axis, the brake housing defining a bore;
   a piston disposed within the bore of the brake housing about a first axis, the piston configured to maintain frictional engagement between a brake pad and the brake surface by applying a first braking force to the brake pad to partially apply the yaw brake and a second braking force to the brake pad to fully apply the yaw brake, the second braking force greater than the first braking force, the piston including first and second portions disposed within corresponding first and second portions of the bore of the brake housing, the first portion of the piston circular in shape and spaced from the brake pad by the second portion of the piston, the second portion of the piston and the second portion of the bore of the brake housing having complementary non-circular shapes and the second portion of the piston configured to be positioned within the second portion of the bore of the brake housing when the piston applies the first braking force and when the piston applies the second braking force; and,
   an anti-rotation bushing disposed radially between the second portion of the piston and the second portion of the bore of the brake housing, the anti-rotation bushing having a non-circular shape complementary to the non-circular shape of the second portion of the piston and the non-circular shape of the second portion of the bore of the brake housing and configured to absorb loads imparted to the piston by rotation of the braking surface relative to the yaw brake.

2. The yaw brake of claim 1 wherein the second portion of the piston and the second portion of the bore of the brake housing define a plurality of flats.

3. The yaw brake of claim 2 wherein the second portion of the piston and the second portion of the bore of the brake housing are hexagonal in shape.

4. The yaw brake of claim 1 wherein the anti-rotation bushing is made from a polymer material.

5. The yaw brake of claim 1 wherein the anti-rotation bushing includes a first member configured to be located between a first circumferential portion of the second portion of the piston and second portion of the bore of the brake housing and a second member configured to be located between a second circumferential portion of the second portion of the piston and the second portion of the bore of the brake housing.

6. The yaw brake of claim 5 wherein each of the first and second members of the anti-rotation bushing span one half of the circumference of the second portion of the piston.

7. The yaw brake of claim 1 wherein the anti-rotation bushing is configured to move with the piston along the first axis.

8. The yaw brake of claim 1 wherein the piston is configured to move relative to the anti-rotation bushing along the first axis.

9. The yaw brake of claim 1 wherein the anti-rotation bushing is not disposed between the first portion of the piston and the first portion of the bore of the brake housing.

10. A yaw brake for a wind turbine, comprising:
a brake housing defining first and second jaws configured to be disposed on opposite sides of a brake surface disposed about a yaw axis, the brake housing defining a bore in one of the first and second jaws;
a piston disposed within the bore of the brake housing about a first axis, the piston configured to maintain frictional engagement between a brake pad and the brake surface by applying a first braking force to the brake pad to partially apply the yaw brake and a second braking force to the brake pad to fully apply the yaw brake, the second braking force greater than the first braking force, the piston including first and second portions disposed within corresponding first and second portions of the bore of the brake housing, the first portion of the piston circular in shape and spaced from the brake pad by the second portion of the piston, the second portion of the piston and the second portion of the bore of the brake housing having complementary non-circular shapes and the second portion of the piston configured to be positioned within the second portion of the bore of the brake housing when the piston applies the first braking force and when the piston applies the second braking force; and,
an anti-rotation bushing disposed radially between the second portion of the piston and the second portion of the bore of the brake housing, the anti-rotation bushing having a non-circular shape complementary to the non-circular shape of the second portion of the piston and the non-circular shape of the second portion of the bore of the brake housing and configured to absorb loads imparted to the piston by rotation of the braking surface relative to the yaw brake.

11. The yaw brake of claim 10 wherein the anti-rotation bushing is not disposed between the first portion of the piston and the first portion of the bore of the brake housing.

12. The yaw brake of claim 10 wherein the anti-rotation bushing is made from a polymer material.

13. The yaw brake of claim 10 wherein the anti-rotation bushing includes a first member configured to be located between a first circumferential portion of the second portion of the piston and second portion of the bore of the brake housing and a second member configured to be located between a second circumferential portion of the second portion of the piston and the second portion of the bore of the brake housing.

14. The yaw brake of claim 13 wherein each of the first and second members of the anti-rotation bushing span one half of the circumference of the second portion of the piston.

15. The yaw brake of claim 10 wherein the anti-rotation bushing is configured to move with the piston along the first axis.

16. The yaw brake of claim 10 wherein the piston is configured to move relative to the anti-rotation bushing along the first axis.

17. The yaw brake of claim 10 wherein the second portion of the piston and the second portion of the bore of the brake housing define a plurality of flats.

18. The yaw brake of claim 17 wherein the second portion of the piston and the second portion of the bore of the brake housing are hexagonal in shape.

* * * * *